Dec. 27, 1949  W. C. JENSON  2,492,223
SWATHER
Filed May 7, 1945  4 Sheets-Sheet 2
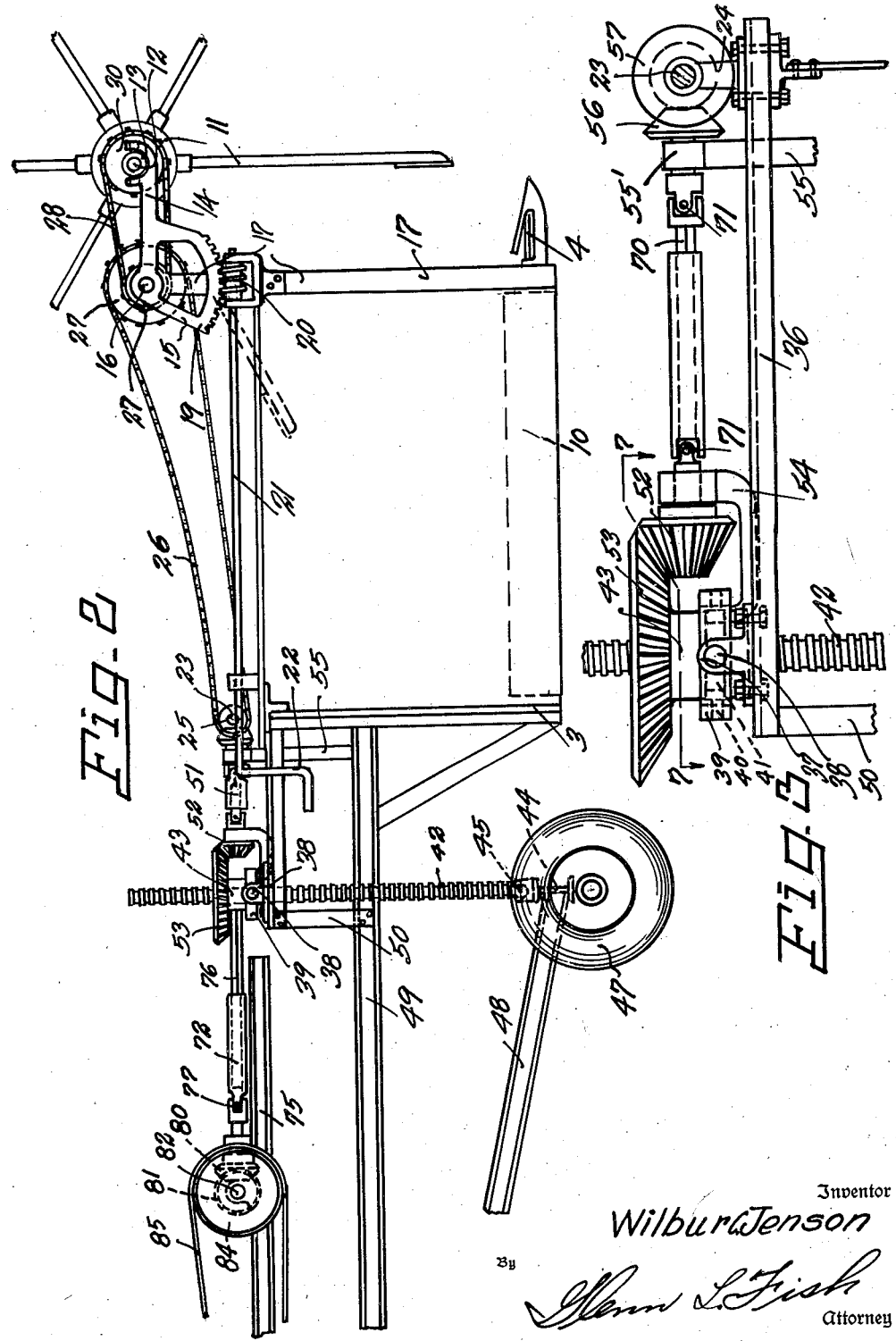
Inventor
Wilbur C. Jenson
By Glenn L. Fish
Attorney

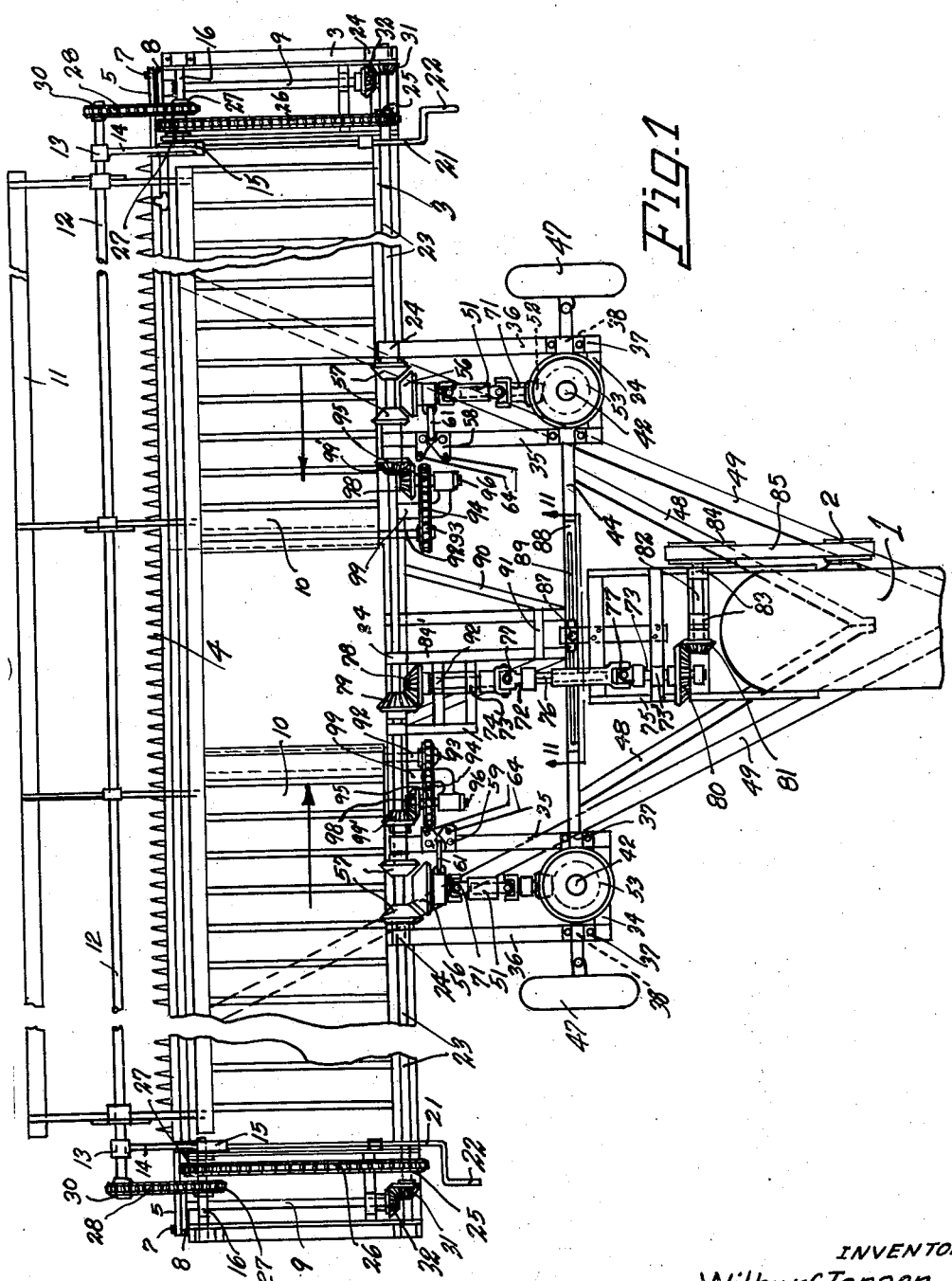

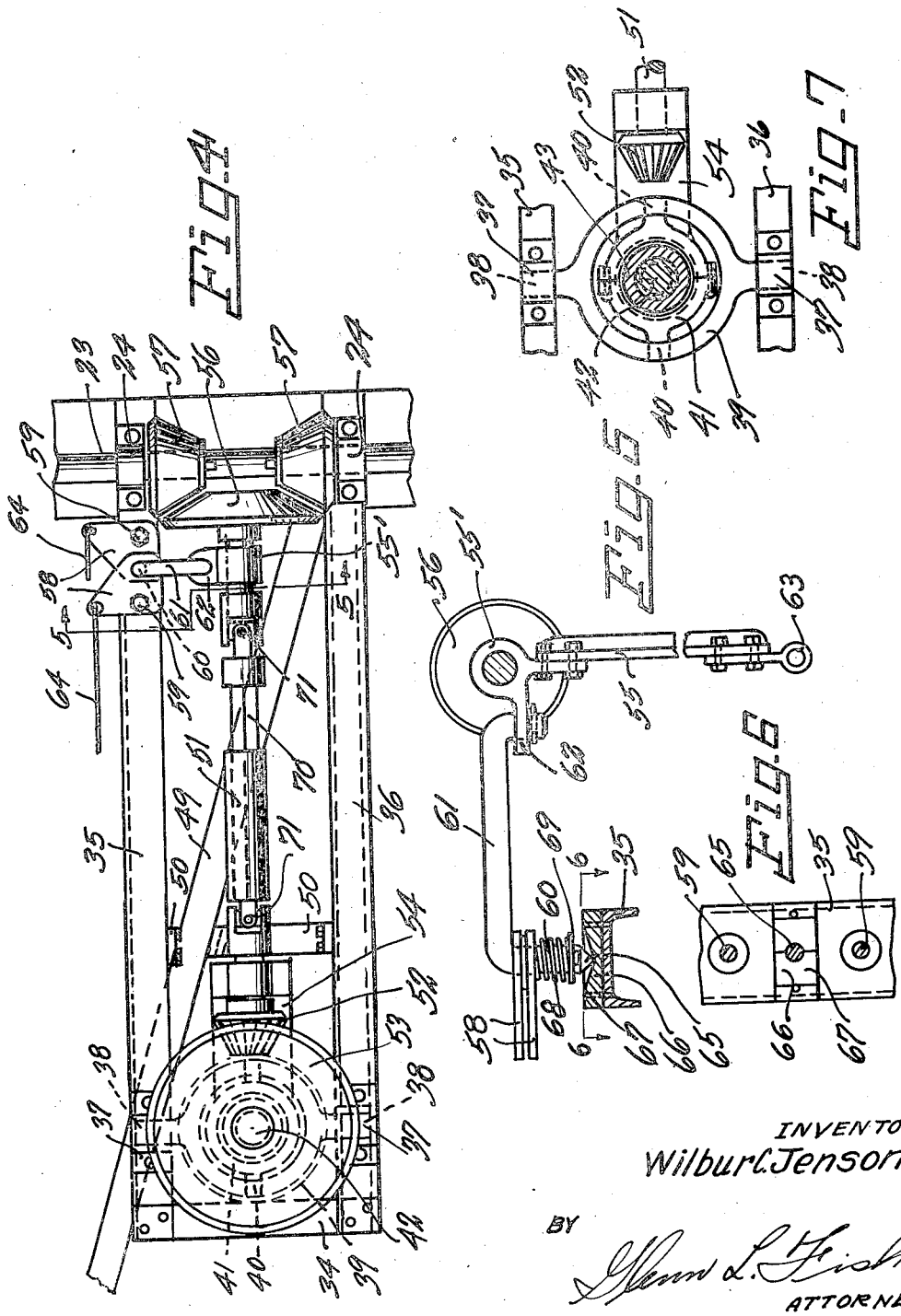

Dec. 27, 1949 W. C. JENSON 2,492,223
SWATHER
Filed May 7, 1945 4 Sheets-Sheet 4
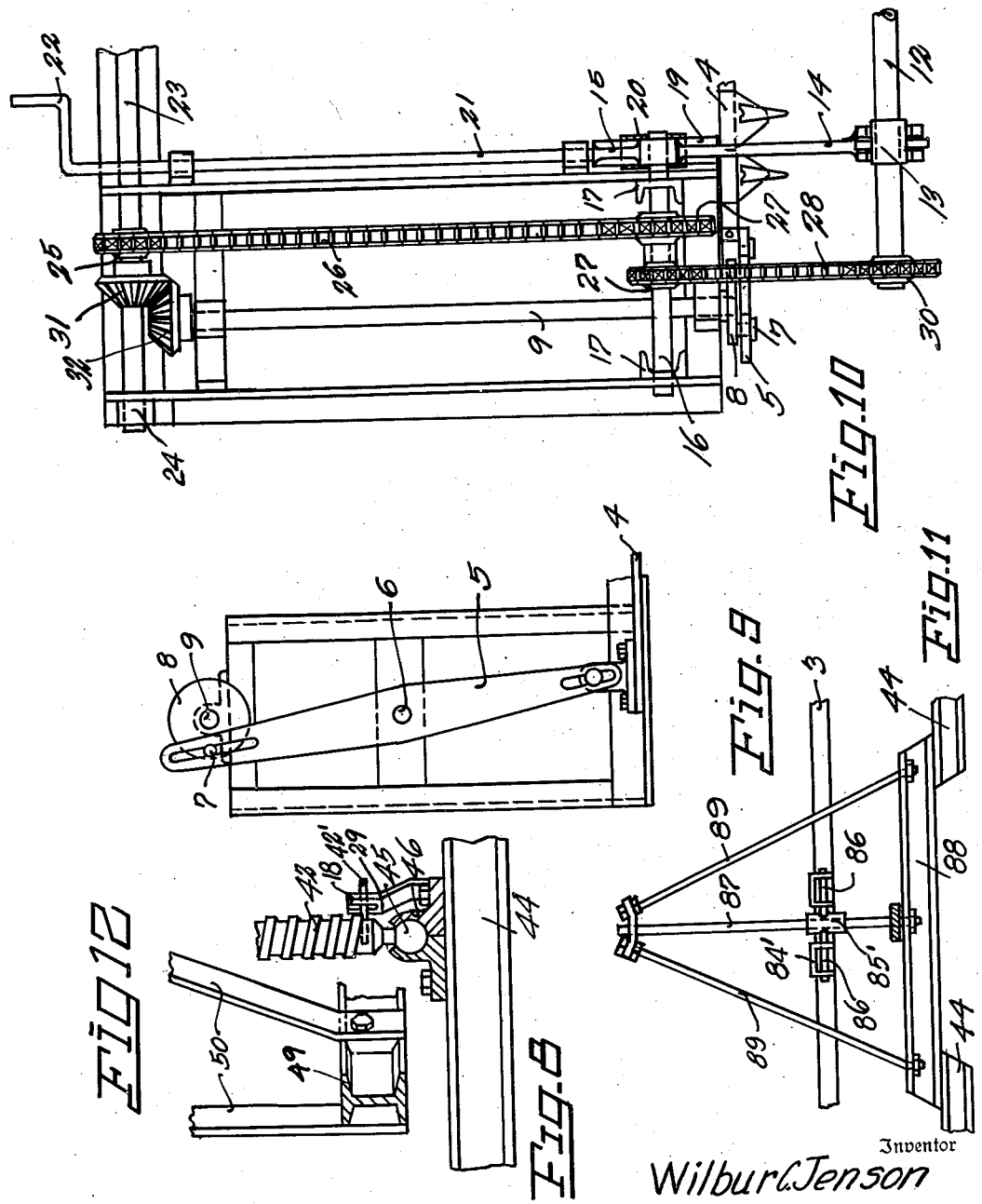
Inventor
Wilbur C. Jenson
By
Glenn L. Fish
Attorney Patented Dec. 27, 1949

2,492,223

UNITED STATES PATENT OFFICE 2,492,223

SWATHER

Wilbur C. Jenson, Seattle, Wash.

Application May 7, 1945, Serial No. 592,439

5 Claims. (Cl. 56—192)

1

This invention relates to a swather used for harvesting grain and other growing crops and it is one object of the invention to provide a machine by means of which grain may be cut and deposited in a windrow across a field as the machine is moved across the field.

Another object of the invention is to provide a machine of this character wherein growing grain is moved into contact with knives of a long cutter bar at the front of the machine and the cut grain moved toward the center of the machine, where it is deposited on the ground between inner ends of conveyor belts and left in a windrow to sweat and cure before being gathered and threshed.

Another object of the invention is to provide a swather so constructed that the frame carrying the cutter bar and the conveyors may be vertical-adjusted and cut the grain a predetermined distance above the ground, there being also provided a reel mounted over the cutter bar and vertically adjustable so that it will be in predetermined relation to the cutter bar.

Another object is to provide a swather which may be attached to a tractor, at the front thereof, and driven by power delivered from the power take-off of the tractor as the tractor is driven across a field.

Another object is to provide a swather having cutting mechanism and conveyors, all of which are driven from a single drive shaft rotatably mounted across the rear end of the swather and receiving rotary motion from the power take-off of the tractor.

Another object of the invention is to provide a swather which is of simple construction, efficient in operation, and not liable to get out of order when in use.

In the accompanying drawings:

Fig. 1 is a top plan view showing the improved swather connected with a tractor.

Fig. 2 is a view looking at one end of the improved swather.

Fig. 3 is a side view of the lowering mechanism.

Fig. 4 is a top view of Fig. 3.

Fig. 5 is a view on the line 5—5 of Fig. 4.

Fig. 6 is a view on the line 6—6 of Fig. 5.

Fig. 7 is a view on the line 7—7 of Fig. 3.

Fig. 8 is a fragmentary view of the means for vertically adjusting the sickle bar.

Fig. 9 is a fragmentary view showing the mechanism for reciprocating the sickle bar.

Fig. 10 is a top plan view of the mechanism for driving and adjusting the reel.

2

Fig. 11 is a sectional view on the line 11—11 of Fig. 1.

Fig. 12 is a fragmentary view showing a portion of the frame in perspective.

This improved swather is connected with a tractor of conventional construction when in use and, in Fig. 1, a portion of a tractor has been shown and indicated generally by the numeral 1. The usual power take-off is provided at a side of the tractor and includes the pulley 2.

The swather is mounted in front of the tractor and has a main frame 3 along the front edge of which extends a sickle bar 4 having its ends connected with lower ends of rocker bars 5 which extend vertically and are pivoted to the frame by pins 6. Upper ends of these rocker bars are formed with longitudinally extending slots 5' to receive pins 7 projecting from disks 8 fixed to front ends of shafts 9 and, when the shafts 9 are rotated, the bars 5 will be rocked about the pins 6 and reciprocating movement imparted to the cutter bar 4. Therefore, grain engaged by the blades of the cutter bar will be cut and fall upon the conveyors 10, which carry it toward the center of the frame, as indicated by the arrows in Fig. 1. The conveyors terminate in spaced relation to each other and the cut grain will be deposited upon the ground midway the width of the swather in position to form a windrow over which the tractor passes as it moves forwardly across a field. A reel 11 extends the full length of the frame 3 and its shaft 12 has its ends rotatably mounted in bearings 13 of arms 14 which project forwardly from quadrants 15 carried by shafts 16 affixed to standards 17 rising from opposite ends of the frame 3. The quadrants are formed with racks 19 meshing with worms 20 at front ends of shafts 21 which are rotatably mounted along outer sides of upper ends of the standards 17 and have cranks 22 at their rear ends so that they may be turned and swing the quadrants about the shafts 16 to raise or lower the arms 14 and shift the reel to vertically adjusted positions. Therefore, the reel may be supported in such relation to the cutter bar that as the reel turns it will press growing grain toward the cutter bar and push the cut grain rearwardly onto the conveyors.

A main shaft 23 extends along the rear of the frame 3 and is rotatably mounted in a suitable number of bearings 24. This shaft carries sprocket wheels 25 engaged by chains 26 trained about double sprocket wheels 27 carried on the shafts 16, so that, as the shaft 23 turns, rotary motion will be transmitted to the double sprocket wheels 27 and to the reel by chains 28 trained about sprocket wheel 30 carried by the ends of the shaft 12 of the reel. At its ends, the shaft 23 carries beveled gears 31 meshing with beveled gears 32 carried by the shafts 9 so that the shafts 9 will be rotated and the cutter bar reciprocated by power delivered from the main shaft.

Back of the main frame are auxiliary frames 34 including inner and outer side bars 35 and 36. These bars carry bearings 37 in which are engaged trunnions 38 of a bearing ring 39, which is formed with bearings to receive trunnions 40 of a second ring 41, the trunnions of the two rings being disposed at right angles to each other so that a threaded post or hanger-bar 42, engaged through the internally threaded sleeve 43 about which the ring 41 is secured, may have universal tilting movement. The posts 42 constitute a support and rest on an I-beam 44 and each has a ball 45 at its lower end engaged in a socket 46 carried by the I-beam 44 equipped with wheels 47 which are rotatably mounted by suitable bearings carried by the I-beam. When the beveled gears 53 and sleeves 43 are turned, the sleeves will be shifted along the posts and the frames 34 and the main frame raised or lowered, according to the direction in which the gears are turned, and the cutter bar and conveyors held in desired spaced relation to the ground. Therefore, when the grain is cut, stubble of the desired length will be left in the field. Post 42 is held from rotation by a pin 42' which extends horizontally from the post and rests in a slot 18. The slot is provided in the upper end of a bracket 29. The bracket is secured to the base of socket 46. Radius rods 48 extend between the axle and tractor and there have also been provided bracing bars 49 which carry the entire frame and are secured to lower ends of strips 50 which are supported from the rear ends of the auxiliary frames 34.

To shift the frame 3 to vertically adjusted positions, there have been provided flexible shafts 51 which extend longitudinally of the auxiliary frames 34 and carry at their rear ends, beveled gears 52 meshing with the gears 53 having the sleeves 43 formed integral therewith. Each shaft 51 has its rear portion rotatably supported by a bearing bracket 54 attached to ring 41 and its forward portion rotatably supported by a bearing bracket 55' and carries a beveled friction gear 56 disposed between companion friction gears 57 carried by the shaft 23. The gears 56 are normally out of contact with gears 57, so that the frame 3 remains in vertically adjusted position and, by swinging the shafts 51 transversely of the auxiliary frames, their gears 56 may be selectively moved into engagement with the gears 57 and the shafts rotated to turn the gears 53 in a desired direction and cause the frame 3 to be raised or lowered according to the direction in which the gears 53 and their sleeves or hubs 43 are turned. Plates 58 are pivoted to each bar 35 by pins 59 and have overlapped portions through which passes a finger 60 extending downwardly from the arm or link 61 having its inner end pivotally engaged through an ear 62 projecting from the bearing 55' at the upper end of each bearing bracket 55. These brackets 55 have their lower ends formed with bearings 63 pivoted to the bars 49 and, when pull is exerted upon one of the lines 64 attached to the plates 58, the plate to which the line is attached will be swung about its pin 59 and the bearing bracket 55 swung transversely of the auxiliary frame and cause the friction gear 56 to be moved into engagement with a friction gear 57. The finger 60 terminates in a point 65 at its lower end and this point rests in a groove 66 formed in the upper surface of a block 67 mounted upon the bar 35. A spring 68 coiled about the finger 60 with its lower end bearing upon a collar 69 carried by the finger and its upper end engaging the plates 58, urges the pin downwardly and, when pull upon a line is released, the sloping surface of the groove 66, shown in Fig. 5, will cause the finger 60 to tend to return to its normal position midway the length of the groove and restore the shaft 51 and friction gear 56 to the normal position shown in Fig. 4. Since each shaft 51 is formed of telescoping sections 70 and provided with universal joints 71, these shafts may extend longitudinally and contract when necessary and also assume angularly adjusted positions when the frame 3 is shifted vertically to adjusted positions.

Rotary movement is transmitted to the shaft 23 from a flexible shaft 72 and 73 rotatably mounted through bearing brackets 73' carried by frames 74 and 75 and extending rearwardly from the frame 3 and the axle 44, the frame 75 being secured in straddling relation to the front of the tractor. This shaft 72 has telescoping sections 76 and universal joints 77 and, at its front end, carries a beveled gear 78 meshing with a beveled gear 79 carried by the shaft 23. At its rear end, the shaft 72 carries a beveled gear 80 meshing with a beveled gear 81 carried by a shaft 82 and, referring to Figs. 1 and 2, it will be seen that shaft 82 is rotatably mounted through bearings 83 and, at its outer end, carries a pulley 84 engaged by a belt 85 which is also trained about the pulley 2 of the power take-off of the tractor. Therefore, during operation of the machine, the shaft 23, will be rotated by power transmitted from the power take-off of the tractor and power will be transmitted from shaft 23 to the cutter bar, the reel, conveyors, and lifts.

The frame 3 is supported on posts that rest in ball and socket bearings. It is also desirable to prevent it from canting to the right or left. In order to do so, there has been provided bars 84' which extend rearwardly from the frame 3 and have their rear ends connected with a sleeve 85' by a pin or rod 86. The sleeve is slidable vertically upon an upright rod 87 carried by the intermediate portion 88 of the axle 44 and braced by diagonally extending rods or struts 89. There have also been provided diagonally extending bars 90 for bracing the bars 84' and the bars 84' are additionally braced by a cross bar 91.

The conveyors are trained about rollers, the inner ones of which have their shafts 92 extending rearwardly and carrying sprocket wheels 93 engaged with chains 94 which extend upwardly and are trained about sprocket wheels 95 carried by short shafts 96 which are rotatably carried by brackets 99. These shafts 96 carry gears 98 which mesh with gears 99' upon the drive shaft 23 so that the conveyors will be driven from the drive shaft.

What is claimed is:

1. A swather comprising a main frame, a cutter bar along the front of said main frame, a main drive shaft extending longitudinally of said main frame, driving connections between the shaft and the cutter bar, auxiliary frames extending rearwardly from the main frame, an axle under said auxiliary frames, threaded posts extending upwardly from said axle, collars rotatably carried by said auxiliary frames and in threaded engagement with said posts, means for transmitting rotary motion to said main drive shaft, and means for transmitting rotary movement from said drive shaft to said collars and shifting the collars along the posts to vertically adjust the main frame.

2. A swather comprising a main frame, a cutter bar along the front of said main frame, a main drive shaft extending longitudinally of said main frame, driving connections between the shaft and the cutter bar, auxiliary frames extending rearwardly from the main frame, an axle under said auxiliary frames, threaded posts extending upwardly from said axle, collars rotatably carried by said auxiliary frames and in threaded engagement with said posts, countershafts rotatably mounted longitudinally of the auxiliary frames and having their rear ends in geared connection with said collars, gears at front ends of the countershafts disposed between gears carried by said drive shaft and normally spaced therefrom, means for shifting said countershafts transversely and moving the gears at their front ends into engagement with selected ones of the companion gears carried by the drive shaft for rotating the collars in predetermined direction and shifting the main frame to vertically adjusted positions, and means for rotating said main shaft.

3. A swather comprising a main frame, a cutter bar along the front of said main frame, a main drive shaft extending longitudinally of said main frame, driving connections between the shaft and the cutter bar, auxiliary frames extending rearwardly from the main frame, an axle under said auxiliary frames, threaded posts extending upwardly from said axle, collars rotatably carried by said auxiliary frames and in threaded engagement with said posts, countershafts rotatably mounted longitudinally of the auxiliary frame and having their rear ends in geared connection with said collars, gears at front ends of the countershafts disposed between gears carried by said drive shaft and normally spaced therefrom, said countershafts having universal joints, brackets in said auxiliary frames disposed vertically and having their lower ends pivoted for movement transversely of the auxiliary frames and their upper ends provided with bearings engaged about the countershafts, companion plates pivoted at a side of each auxiliary frame and having portions overlapped, links extending from the bearings and each having a finger passing through overlapped portions of companion plates, means for turning the plates about their pivots and shifting the links longitudinally to shift the countershafts transversely and move their front gears into engagement with selected gears of the drive shaft for rotating the collars on said posts in predetermined directions and shift the main frame vertically to adjusted positions, and means for transmitting rotary motion to the drive shaft.

4. A swather comprising a main frame, a cutter bar along the main frame at the front thereof, a main drive shaft extending longitudinally of said main frame, driving connections between the shaft and the cutter bar, auxiliary frames extending rearwardly from the main frame, an axle under said auxiliary frames, threaded posts extending upwardly from said axle, collars rotatably carried by said auxiliary frames and in threaded engagement with said posts, countershafts rotatably mounted longitudinally of the auxiliary frame and having their rear ends in geared connection with said collars, gears at front ends of the countershafts disposed between gears carried by said drive shaft and normally spaced therefrom, said countershafts having universal joints, brackets in said auxiliary frames disposed vertically and having their lower ends pivoted for movement transversely of the auxiliary frames and their upper ends provided with bearings engaged about the countershafts, plates pivoted to the auxiliary frames and connected with the bearings, means for turning said plates about their pivots and tilting the brackets to swing the countershafts transversely of the auxiliary frames and move the gears at their front ends into engagement with selected gears of the drive shaft to rotate the collars about the posts and vertically adjust the position of said main frame, and means for rotating said drive shaft.

5. The structure of claim 2, wherein the collars are rotatably supported in gimbals carried by the auxiliary frames and permitting universal tilting movement of the posts relative to the auxiliary frames, the countershafts having front and rear sections carrying the gears and telescoping intermediate sections connected with the end sections by universal joints.

WILBUR C. JENSON.

REFERENCES CITED

The following references are of record in the file of this patent:

UNITED STATES PATENTS

| Number | Name | Date |
|---|---|---|
| 23,090 | Kinyon | Mar. 1, 1859 |
| 319,257 | Hunt | June 2, 1885 |
| 885,157 | Hovland | Apr. 21, 1908 |
| 959,819 | Towner | May 31, 1910 |
| 1,154,493 | Drygas | Sept. 21, 1915 |
| 2,174,757 | Potter | Oct. 3, 1939 |
| 2,253,044 | Ommodt | Aug. 19, 1941 |
| 2,280,453 | Rucker et al. | Apr. 21, 1942 |